United States Patent [19]

Preston et al.

[11] Patent Number: 4,986,553
[45] Date of Patent: Jan. 22, 1991

[54] SHAFT SEAL

[75] Inventors: Stuart Preston, Morpeth; Robert Holloran, Whitley Bay; Brian Lidgate, Killingworth, all of United Kingdom

[73] Assignee: George Angus & Company Limited, Newcastle-upon-Tyne, England

[21] Appl. No.: 346,947
[22] PCT Filed: Oct. 5, 1987
[86] PCT No.: PCT/GB87/00705
 § 371 Date: Apr. 7, 1989
 § 102(e) Date: Apr. 7, 1989
[87] PCT Pub. No.: WO88/02454
 PCT Pub. Date: Apr. 7, 1988

[30] Foreign Application Priority Data
 Oct. 6, 1986 [GB] United Kingdom ............... 8623930

[51] Int. Cl.⁵ ............................................. F16J 15/32
[52] U.S. Cl. ................................... 277/152; 277/134
[58] Field of Search ............. 277/214, 227, 152, 154, 277/35, 134, 153

[56] References Cited
U.S. PATENT DOCUMENTS

| | | | |
|---|---|---|---|
| 3,549,445 | 10/1964 | McMahon | 277/152 |
| 3,938,813 | 2/1976 | Forch | 277/152 |
| 4,194,748 | 3/1980 | Forch et al. | 277/134 |
| 4,513,976 | 4/1985 | Bentley et al. | |
| 4,616,836 | 10/1986 | Drygalski et al. | 277/152 |

FOREIGN PATENT DOCUMENTS

| | | | |
|---|---|---|---|
| 0122319 | 10/1984 | European Pat. Off. | |
| 2239626 | 2/1975 | France | |
| 2585103 | 1/1987 | France | 277/152 |
| 2045387 | 10/1980 | United Kingdom | 277/152 |
| 2073845 | 10/1981 | United Kingdom | 277/152 |
| 2105797 | 3/1983 | United Kingdom | 277/134 |

OTHER PUBLICATIONS

International Automotive Engineering Congress, Detroit, Mich, Jan. 8-12, 1973, SAE, Inc., S. A. Sekulich: "TFE(Teflon) Radial Lip Seals".

Primary Examiner—William A. Cuchlinski, Jr.
Assistant Examiner—Daniel G. DePumpo
Attorney, Agent, or Firm—William R. Hinds

[57] ABSTRACT

A shaft seal comprises a rigid case ring 1 and a sealing ring which has a PTFE or like ring component 4 secured in the case ring by a molded elastomeric ring component 5 molded into and face-bonded to the case ring, to secure the PTFE ring component in place, and having elastomeric material 7 extending over the air side face of the PTFE ring component, toward a sealing periphery thereof, and forming the wiping seal. Optionally, the elastomeric material is molded into a hydrodynamic, positive sealing configuration of ribs or grooves 8.

9 Claims, 3 Drawing Sheets

SHAFT SEAL

This invention relates to shaft seals, also known as oil seals, for sealing against fluid leakage between shafts, or similar relatively rotatable mechanical members, and their housings.

A widely-used construction of such a seal comprises a rigid case ring, usually an L-section ring of metal or, more recently, a phenolic resin or other rigid plastics material, and a sealing ring secured to the case ring. For a so-called internal seal, the case ring fits, statically sealed, in a housing and the sealing ring bears peripherally, as a wiping seal, against the shaft. For an external seal, only occasionally required, the case ring fits on the shaft and the sealing ring bears against a surrounding cylindrical surface of a housing.

The sealing ring material is commonly an elastomer, such as an oil-resistant synthetic rubber, but for some purposes, particularly for resistance to corrosive fluids, fluorocarbon resins are used, especially polytetrafluoroethylene (PTFE).

PTFE cannot be moulded satisfactorily by simple heat and pressure in the same way as a rubber type elastomer and sealing rings of such material are usually made as discs or washers cut from the sintered resin and pressed and set or otherwise formed to a belled or like frusto-conical shape, for example.

Difficulty is encountered in strongly securing a PTFE sealing ring fluid-right to a rigid case ring. Probably the most widely used construction is one in which a peripheral margin of the sealing ring is clinched in the case ring by a rigid holding ring, with or without a rubber or other deformable packing ring. EP, A, 0122319 (FREUDENBERG) discloses bonding a PTFE lip ring 2 to a stiffening ring 1 by an intermediate layer 6 of rubber-elastic material. FR, A, 2239626 (FREUDENBERG) discloses a fibrous sealing ring 3 having an oil side impermeable layer 5.

It is an object of the present invention to provide a composite shaft seal advantageously combining fluorocarbon and elastomer in a sealing ring.

According to the present invention, a shaft seal comprises a rigid case ring and a resiliently deformable sealing ring secured to the case ring, the sealing ring having two annular components, one component being an annulus of fluorocarbon resin material and the other component being an elastomeric material which extends in a bonded layer over the air side face of the fluorocarbon component to a sealing periphery thereof and forms the wiping seal.

Thus, the elastomeric component can form the shaft seal with the fluorocarbon component resiliently supporting the bonded layer of elastomer and, being on the oil side thereof, additionally providing a corrosion resistance facing therefor; at the same time, the elastomer component can securely bond the fluorocarbon component to the case ring.

In shaft seals, it is now common to provide, on the air side of a seal lip, i.e. facing away from the sealed fluid at the oil side, helical or like ribs or grooves forming a hydrodynamic configuration designed to promote, in use, a positive sealing action by feedback of fluid tending to leak past the sealing lip.

It has not been found satisfactory to mould a hydrodynamic configuration on a PTFE shaft sealing lip and such a configuration is usually formed by coining the resin under high mechanical pressure.

The present invention additionally provides a shaft seal with a hydrodynamic configuration by using technology well-proved from established moulding of elastomeric shaft seals.

According to an embodiment of the present invention, the bonded layer of elastomer is moulded into a hydrodynamic, positive sealing action, configuration over the air side face of the fluorocarbon component.

The invention thus enables a shaft seal to be provided with a PTFE, or like, sealing ring to suit operating requirements and also to have an accurately defined hydrodynamic configuration using the same elastomer moulding technology as is used for securing the PTFE ring in its case.

Other features of the invention are set out in the claims and described with reference, by way of example, to the accompanying drawings, in which:

Figure 2:
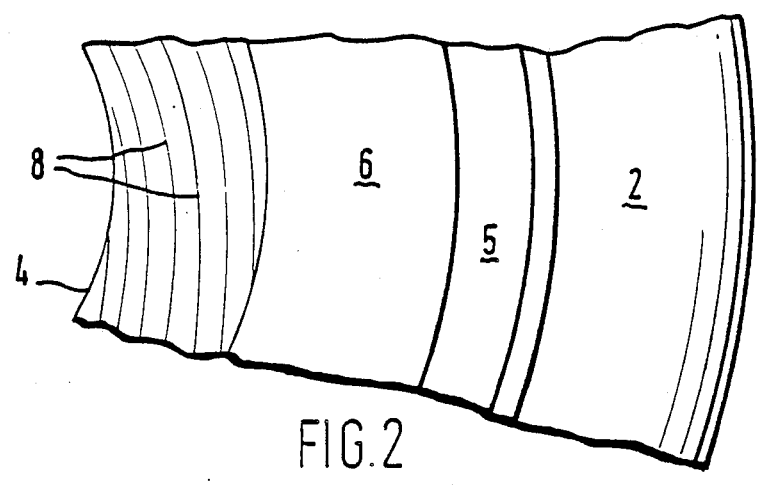
FIG. 2 is a fragmentary elevation, from the air side A, of the seal of FIG. 1.
Figure 1:
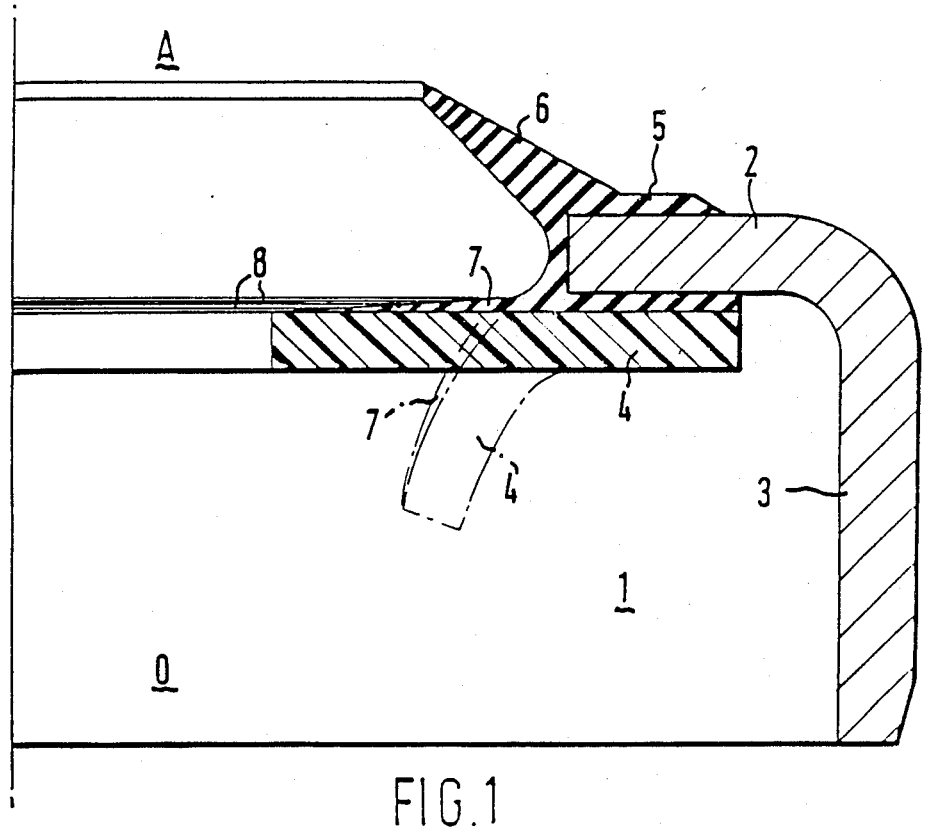
FIG. 1 is an axial radial-section of an internal shaft seal in accordance with the invention, as moulded.

The shaft seal shown by FIGS. 1 and 2 is an internal seal and comprises a rigid case ring 1, for example of a metal such as mild steel, of L-section with a radial flange 2 and an axial flange 3.

A PTFE sealing ring component 4 is secured to the radial flange 2 of the case ring by being bonded to a moulded elastomeric sealing ring component 5, such as an oil-resistant synthetic nitrile or other rubber, which embeds and is bonded to the inner peripheral margin of the flange 2 and optionally is moulded with a supplementary sealing lip 6, to serve as a dust lip, as is known. The technology for effecting face-bonding between elastomers and metals or other case rings and PTFE, using a bonding agent at the interfaces, is well-known in oil seal manufacture.

The surface of the PTFE component has to be etched, to dissolve the resin and leave carbon in the surface layer, thereafter conventional elastomer/metal bonding techniques are equally effective in bonding elastomer/etched fluorocarbon surfaces.

The sealing ring component 4 is a single flat annulus cut from sheet or parted as a slice from a cylindrical billet of PTFE in accordance with known practice.

The ring component 5 essentially is moulded so that its elastomeric material extends to cover the air side of the inner peripheral margin of the PTFE ring component 4 with a relatively thin bonded layer 7 of elastomer; the layer tapering to the periphery of component 4.

The elastomer bonded layer 7 is moulded with helical or like ribs or grooves 8 which face the air side and provide a hydrodynamic feature designed to promote positive action sealing in a manner now well-known. A typical configuration for the ribs or grooves 8 is shown in FIG. 2.

Figure 3:
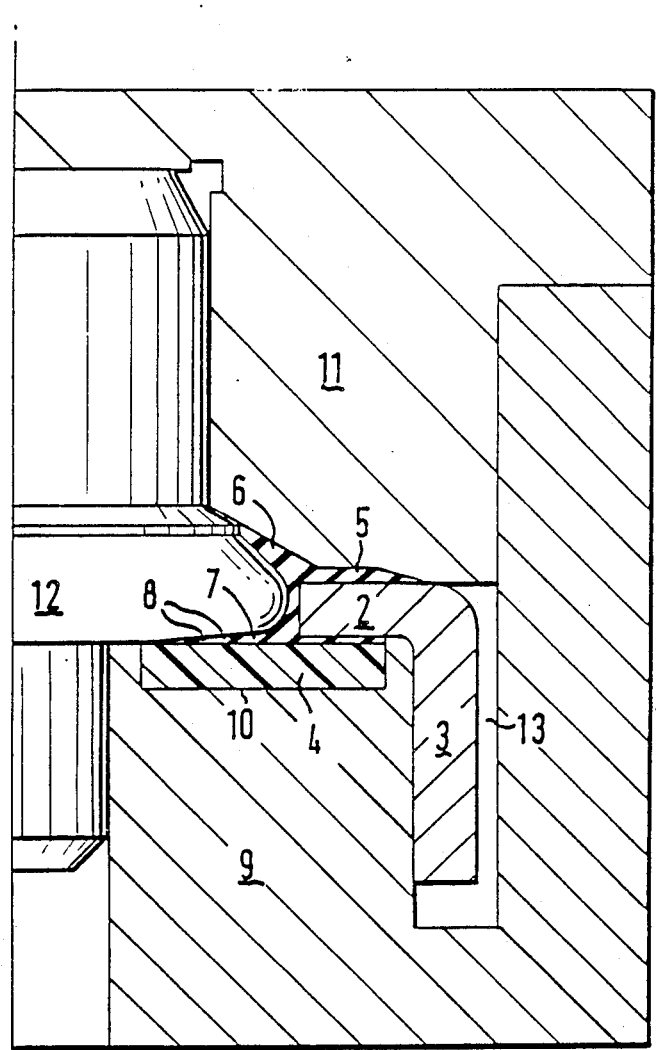
FIG. 3 is an axial radial-section of a moulding press for the seal of FIG. 1.

The bonding of the PTFE ring component 4 to the elastomer ring component 5, the bonding of the ring component 5 to the case flange 2 and the formation of the ribs or grooves 8 are all carried out, using well-known technology, in a moulding press as shown by FIG. 3.

In FIG. 3, a moulding cavity is formed between a lower tool 9, with an annular recess 10 in which a ring of PTFE is placed as an insert to form the ring component 4, an upper tool 11, shaped to the external form of the ring component 5, and a centre pin 12, shaped to the internal form of the ring component 5, including the ribs or grooves 8 in the elastomeric layer 7.

The lower tool 9 also has a recess 13, to receive the case ring 1 as an insert, and this recess may be modified to provide for the elastomer to cover the case ring to any desired extent, as is known practice.

After the seal has been moulded, the sealing ring is formed and set to frusto-conical shape, towards the oil side 0 of the seal, as indicated in broken lines. This may be effected in known manner by passing the seal on to a mandrel, of nominal shaft diameter, and applying heat.

Figure 4:
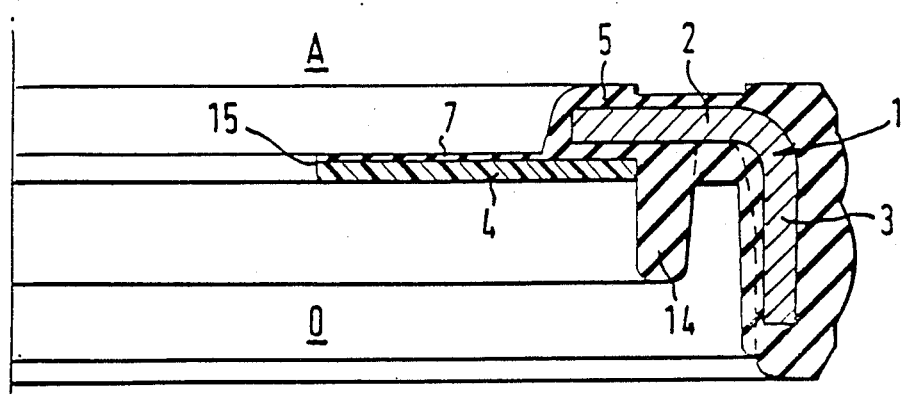
FIG. 4 is an axial radial-section of a hub seal in accordance with the invention, before final assembly.
Figure 5:
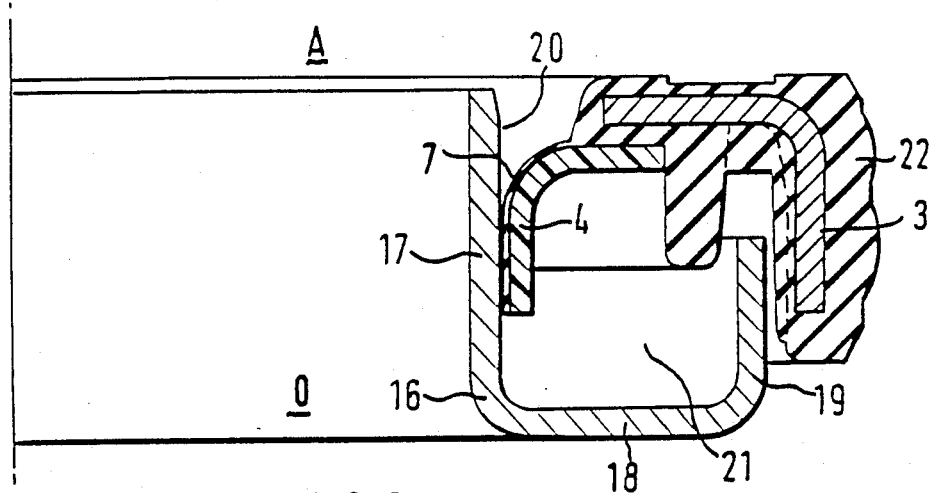
FIG. 5 is an axial radial-section of the hub seal of FIG. 4, fully assembled.

The hub seal shown by FIGS. 4 and 5 is simpler than the shaft seal of FIGS. 1 and 2. However, like parts have been given the same reference. The seal comprises a rigid case ring 1, with a radial flange 2 and an axial flange 3. A PTFE sealing ring component 4, in the form of a single flat annulus, is secured to radial flange 2 of the case ring by being bonded to a moulded elastomeric ring component 5 which embeds and is bonded to the entire case ring 1.

The ring component 5 is moulded so that its elastomeric material extends to cover and bond to air side A of the inner peripheral margin of the ring component 4; forming a relatively thin bonded layer 7 of elastomer.

The elastomer ring component 5 is also moulded to have an axially extending stiffening rib 14 about the outer periphery of the PTFE component 4. The inner peripheries of the PTFE component 4 and the bonded elastomer layer 7 are knifed to form a composite sealing lip 15.

In use, and as shown by FIG. 5, the hub seal has an inner, channel section metal insert 16, having an inner, axial flange 17, a centre radial web 18 and an outer axial flange 19, co-axial with inner flange 17. During final assembly, the PTFE component 4 and bonded elastomeric air side layer 7 are displaced downwardly and inwardly of the seal and insert 16 is introduced so that the elastomeric layer 7 contacts the outer surface 20 of axial flange 17. The annular chamber 21 formed between insert 16 and the seal is filled with grease.

Elastomer layer 7 forms both a static and a wiping seal with flange face 20 of insert 16.

In use, insert 16 is an interference fit on a hub shaft and the outer elastomer covered margin 22 of insert axial flange 3 is an interference fit to statically seal with a housing in a hub.

We claim:

1. A shaft seal having an air side and an oil side and comprising a rigid case ring (1) and a resiliently deformable sealing ring for forming a wiping seal, said sealing ring being secured to the case ring and having two annular components (4, 5), one component being an annulus (4) of fluorocarbon resin material and the other component (5) being of elastomeric material, the improvement wherein the elastomeric component (5) extends in a bonded layer (7) over the air side face of the fluorocarbon component to the sealing periphery (15) thereof and forms the wiping seal.

2. A shaft seal according to claim 1, characterised in that the bonded layer (7) of the elastomeric component (5) is moulded into a hydrodynamic, positive sealing action, configuration (8) over the air side face of the fluorocarbon component (4).

3. A shaft seal according to claim 1 characterised in that the fluorocarbon component (4) is an annulus of fluorocarbon sheet material bonded by the air side face thereof to the elastomeric component (5) in moulding and the bonded layer (7) of elastomeric material tapers in thickness over such face of the fluorocarbon component to a sealing periphery thereof.

4. A shaft seal according to claim 1, characterised in that the case ring (1) has a radial flange (2) around at least a peripheral portion of which the elastomeric component (5) is bonded, so as to extend over both faces of the flange, and the fluorocarbon component (4) is bonded only to and carried by the elastomeric component.

5. A shaft seal according to claim 1, characterised in that the elastomeric component (5) is moulded with a supplementary sealing lip (6).

6. A shaft seal according to claim 1, characterised in that, after moulding of the elastomeric component (5), a peripheral margin portion of the fluorocarbon component (4) is set into the shape of a frusto-conical sealing lip.

7. A shaft seal as claimed in claim 1 characterised in that, after moulding of the elastomeric component (5), the periphery of the fluorocarbon component (4) and the moulded layer (7) of elastomer are knifed to form a sealing lip.

8. A shaft seal as claimed in claim 1 wherein a portion of the sealing ring is of frusto-conical shape such that the wiping seal portion of the air side face of the elastomeric component bonded layer faces generally in the direction of the surface to be sealed in use.

9. A shaft seal as claimed in claim 8 wherein said frusto-conical portion of the sealing ring is a radially inner portion which tapers inwardly in the oil side direction such that the wiping seal portion of the elastomeric component faces generally radially inwardly and lies generally radially inwardly of the adjacent fluorocarbon component.

* * * * *